United States Patent [19]

Roessel

[11] Patent Number: 5,469,236
[45] Date of Patent: Nov. 21, 1995

[54] SNORKEL LENS SYSTEM

[75] Inventor: Wolfgang Roessel, Atlantic Beach, N.Y.

[73] Assignee: Roessel/Cpt, Inc., Woodside, N.Y.

[21] Appl. No.: 374,958

[22] Filed: Jan. 19, 1995

[51] Int. Cl.$^6$ ............................ G03B 17/48; G02B 23/08
[52] U.S. Cl. ............................ 354/79; 354/150; 352/94; 359/402
[58] Field of Search ................... 354/79, 150; 352/94; 348/335; 359/402, 406, 405

[56] References Cited

U.S. PATENT DOCUMENTS

| 4,192,591 | 3/1980 | Yobaccio | 354/79 |
| 4,195,922 | 4/1980 | Hajnal | 354/79 |
| 4,226,518 | 10/1980 | Kellner | 354/79 |
| 4,235,541 | 11/1980 | Jamel | 354/79 |
| 4,375,913 | 3/1983 | Hajnal | 354/79 |
| 4,580,886 | 4/1986 | Hajnal | 354/79 |
| 4,868,588 | 9/1989 | Hajnal | 354/79 |

Primary Examiner—A. A. Mathews
Attorney, Agent, or Firm—Collard & Roe

[57] ABSTRACT

A snorkel lens system having a first tubular member and a second tubular member or vertical relay tube, disposed perpendicular with respect to the first tubular member. A first axis of rotation is centrally disposed through the first tubular member and a second axis of rotation is centrally disposed through the second tubular member. The first axis of rotation is perpendicular to the second axis of rotation. The second tubular member or vertical relay tube can be rotated about both of the two perpendicular axes in two perpendicular planes to provide a three dimensional filming special effect.

8 Claims, 2 Drawing Sheets

SNORKEL LENS SYSTEM

BACKGROUND OF THE INVENTION

1. Field of the Invention

The present invention relates to snorkel lenses. More particularly, it relates to a snorkel lens capable of rotation about two perpendicular axes.

2. The Prior Art

Snorkel lenses of the prior art are connected at one end to a camera and are rotatable about a single axis. Generally, theses lenses are rotatable about the axis of the lens.

The patent to Hajnal, U.S. Pat. Nos. 4,580,886 disclose a rotatable snorkel system that has a prime lens attached to a camera and whereby the optical axis of the prime lens is offset from and parallel to the axis of the camera body.

U.S. Pat. No. 4,868,588 to Hajnal discloses a rotatable snorkel camera system. The prime lens is mounted on the camera body with the snorkel housing rotatably mounted on the prime lens. The snorkel housing is only rotatable about a single axis, and can be used with cameras that do not have detachable lenses.

U.S. Pat. Nos. 4,195,922 and 4,375,913 both by Hajnal, disclose different snorkel systems with prism housings for change the optical path 90 degrees.

SUMMARY OF THE INVENTION

A snorkel lens system is provided having a first tubular member connected at one end to a camera and connected at an opposite end to a first opening in a mirror housing. The mirror housing has an elongated second tubular member connected to a second opening and disposed perpendicular to the first tubular member. A first axis of rotation is centrally disposed through the first tubular member, and a second axis of rotation, perpendicular to the first axis, is centrally disposed through the second tubular member. The second tubular member has a plurality of lenses disposed therein and a 90° prism housing connected to the opposite end thereof. A watertight lens housing is connected to the adjacent opening in the prism housing for containing a lens. The watertight housing has a front for receiving light and additional attachment lenses.

It is therefore an object of the present invention to provide a snorkel lens system capable of rotation about two perpendicular axes in two perpendicular planes.

It is yet another object of the invention to provide a snorkel lens system which provides an unlimited number of positions with 3 dimensional motion for filming special effects.

A further object of the invention is to provide a snorkel lens system that is capable of receiving multiple lens attachments while maintaining rotatable motion about two perpendicular axes.

Another object of the invention is to provide a snorkel lens system that overcomes the shortfalls of the prior art.

It is yet another object of the invention to provide a snorkel lens system that operates efficiently and reliably.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
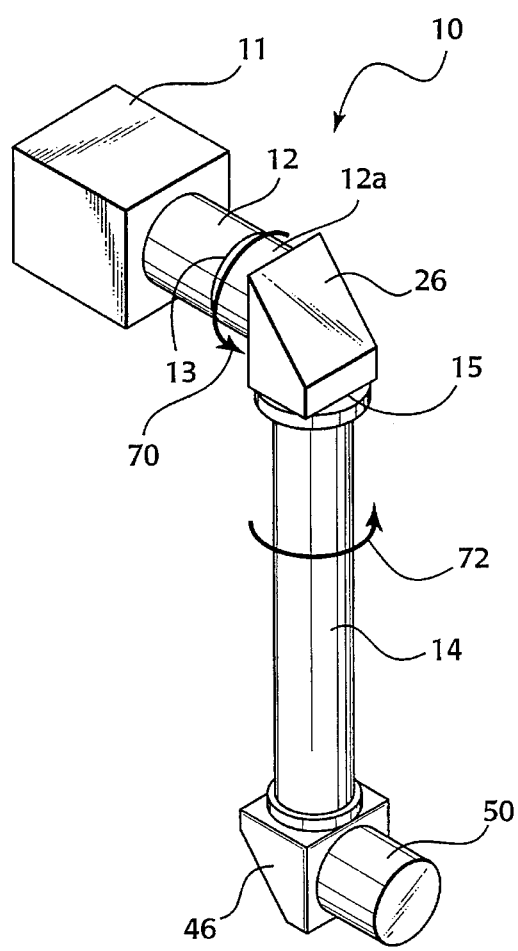
FIG. 1 is a perspective view of the super snorkel lens of the invention in a first position.

Referring to FIG. 1, the super snorkel lens system 10 is shown connected to a camera 11. The camera 11 is generally a movie camera for capturing motion pictures. The lens system 10 has a first tubular member 12 connected to the camera at one end. First tubular member 12 has a rotatable portion 12a and a rotation point 13 along tubular member 12. The rotatable portion 12a is connected to mirror housing 26 in a fixed position, such that said housing rotates with rotatable portion 12a when set into motion as shown by directional arrow 70. A second tubular member or vertical relay tube 14 is connected to tubular member 12 through mirror housing 26 at one end. Tubular member 14 can is rotatable and has a rotation point 15 adjacent housing 26 as indicated by directional arrow 72. A right angle prism housing 46 is connected to the opposite end of tubular member 14, and a watertight lens housing 50 is connected to the other side of the prism housing 46.

Figure 2:
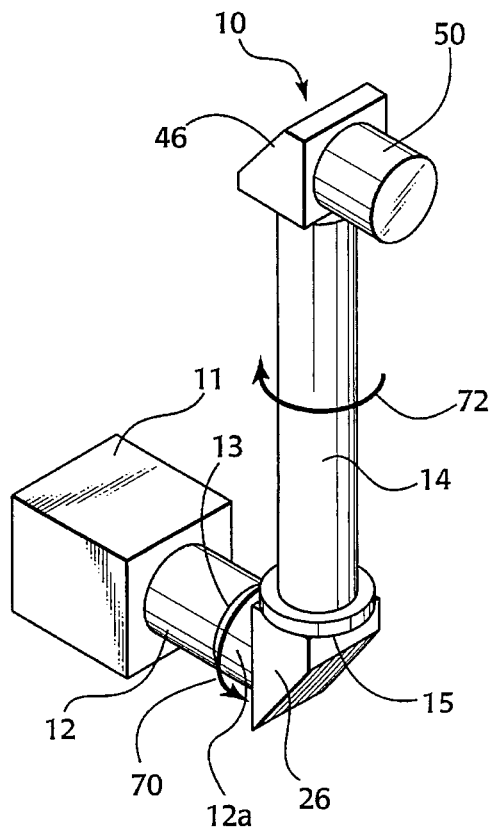
FIG. 2 is a perspective view of the super snorkel lens of the invention in a second rotated position.

FIG. 2 shows the super snorkel lens 10 in a second rotated position. As shown, the rotatable portion 12a of the first tubular member 12 has been rotated approximately 180°, such that tubular member 14 is disposed in a substantially upright position. Second tubular member 14 has also been rotated slightly to show the angular displacement thereof with respect to first tubular member 12.

Figure 3:
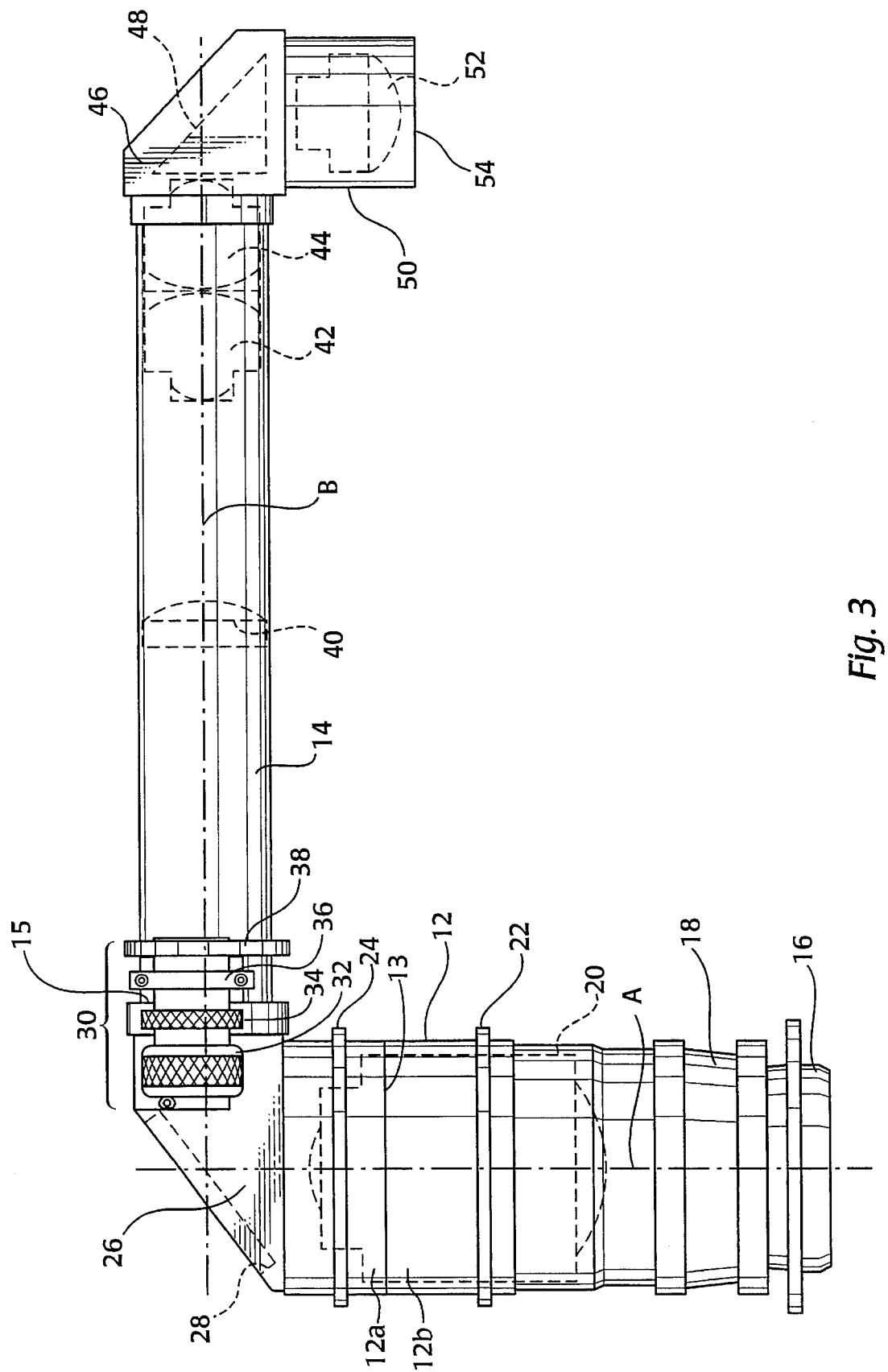
FIG. 3 is a plan view of the super snorkel lens according to the invention.

FIG. 3 shows the super snorkel lens 10 having the first tubular member 12 connected at one end to mirror housing 26, and having a camera mount 16 at the opposite end for affixing the lens 10 onto a camera. The first tubular member 12 has an axis of rotation "A" centrally disposed therethrough, a first fixed portion 12b and a second rotatable portion 12a. The first fixed portion 12b is attached to the camera via barrel 18 and camera mount 16. At the rotation point 13, rotatable portion 12a rotates about axis "A." A lens 20 is disposed within first tubular member 12. Lens 20 could be, for example, an 85 mm F 1.4 lens, or any other lens of suitable known type. First tubular member 12 includes a focus adjustment 22 and an iris diaphragm 24. Focus adjustment 22 is disposed within fixed portion 12b and iris diaphragm 24 is disposed within the rotatable portion 12a.

Mirror housing 26 connects the rotatable portion 12a of first tubular member 12 with the second tubular member 14 such that said tubular members are perpendicular with respect to each other. Mirror housing 26 includes a front sided mirror 28, angularly disposed therein, for transmitting light received through second tubular member 14 into first tubular member 21 without distorting the images captured. A gear mechanism 30 connected to tubular member 14 is connected with mirror housing 26 and rotatably connects to tubular member 14 with housing 26 at rotation point 15.

Gear mechanism 30 includes a motor 32, a dampener 34, a clamp 36 and a gear 38. Thus, second tubular member 14 having an axis of rotation "B", centrally disposed therethrough, can rotate about said axis at the rotation point 15 adjacent clamp 36. The axis of rotation "B" of second tubular member 14 is perpendicular to the axis of rotation "A" of first tubular member 12. Dampener 34 provides smooth rotational motion of tubular member 14, thereby creating a more easily achieved and more accurate panning effect to be filmed.

Second tubular member 14 contains an achromatic lens 40 and two other lenses 42 and 44 for transmitting the light images received therethrough. Lens 40 can be a 90 mm achromatic lens or any other suitable known type of similar lens. Lens 42 and 44 can be an 80 mm F4 and 50 mm F2.8, respectively, or any other suitable known type of lens combination. A prism housing 46 is connected to the opposite end of tubular member 14. Prism housing 46 contains a 90° prism 48 (20×20), or any other prism of suitable known type. A watertight lens housing 50 is connected to the other side of prism housing 46 and contains a lens 52. Lens housing 50 has a front adaptor 54 for receiving light, or in the alternative, for receiving additional lens attachments, not shown. Front adaptor 54 can be a bayonet locking type or a threaded type, both of which are well known in the camera industry.

Thus, second tubular member 14 can be rotated, in conjunction with mirror housing 26 and rotatable portion 12a, about axis "A," while simultaneously or independently being rotated about axis "B." The result is a multi-axis snorkel lens system capable of providing special effect photography for film making.

This snorkel lens system has specialized uses in the television and film industries. For example, when filming commercials where a particular product is featured, it is desireable to show the product from many different perspectives. Among such products are food and recreational products. The snorkel lens system of the invention allows the filming of a specific item from any desired perspective which enhances the appeal of the product by producing a floating or moving image appearance. Thus, it appears as if the camera if being flown around or through the desired film location when it is actually the rotation of the lens system about the two perpendicular axes in two perpendicular planes.

While one embodiment of the present invention has been shown and described, it is to be understood that many changes and modifications may be made thereunto without departing from the spirit and scope of the invention as defined in the appended claims.

What is claimed is:

1. A snorkel lens system comprising:

a first tubular member having a fixed portion connected to a camera, and a rotatable portion having an opposite end, said first tubular member including a first axis of rotation centrally disposed therethrough;

a mirror housing having a first opening connected to said opposite end of said rotatable portion of said first tubular member and a second opening perpendicular to said first opening;

a second tubular member having a first end connected to said second opening of said mirror housing and a second opposite end, said second tubular member including a second axis of rotation centrally disposed therethrough, said second axis being perpendicular to said first axis;

a prism housing having a first opening connected to said second opposite end of said second tubular member and a second opening disposed perpendicular to said first opening; and a lens housing connected to said second opening of said prism housing and having a front adapter for receiving additional attachment lenses, whereby said second tubular member in conjunction with said mirror housing and said rotatable portion of said first tubular member is rotatable about said first axis and said second tubular member is independently rotatable about said second axis, so that the lens attachments connected to said front adapter can be rotated about said two perpendicular axes in two perpendicular planes to provide a three dimensional filming effect.

2. The snorkel lens system according to claim 1, wherein said first tubular member further comprises:

a camera mount disposed on an end of said first fixed portion for connecting the super snorkel lens to the camera;

a lens mounted within said first tubular member;

an iris diaphragm disposed within said second rotatable portion; and a focus adjustment disposed within said fixed portion.

3. The snorkel lens system according to claim 1, further comprising:

a gear mechanism connecting the second opening of said mirror housing with the first end of said second tubular member, said gear mechanism for rotating said second tubular member about the second axis, said gear mechanism including a dampener for providing smooth rotational movement.

4. The snorkel lens system according to claim 3, wherein said second tubular member further comprises a plurality of lenses disposed therein.

5. The snorkel lens system according to claim 3, wherein said mirror housing includes an angularly disposed mirror for transmitting light images directly from said second tubular member into said first tubular member.

6. The snorkel lens system according to claim 4, wherein at least one of said plurality of lenses is an achromatic lens.

7. The snorkel lens system according to claim 1, wherein said prism housing includes a 90° prism for transmitting images received through said lens housing into said second tubular member.

8. The snorkel lens system according to claim 3, wherein said lens housing is watertight and includes a lens mounted therein.

\* \* \* \* \*